United States Patent
Wang et al.

(10) Patent No.: US 7,477,699 B2
(45) Date of Patent: Jan. 13, 2009

(54) TRANSMISSION TECHNIQUE SELECTOR FOR RADIO COMMUNICATION SYSTEMS WITH MULTIPLE TRANSMIT AND MULTIPLE RECEIVE ANTENNAS

(75) Inventors: Fan Wang, Chicago, IL (US); Lawrence A. Downing, Hoffman Estates, IL (US); Amitava Ghosh, Buffalo Grove, IL (US); Chandrasekar Sankaran, Arlington Heights, IL (US); Jun Tan, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 161 days.

(21) Appl. No.: 11/613,349

(22) Filed: Dec. 20, 2006

(65) Prior Publication Data

US 2008/0151804 A1  Jun. 26, 2008

(51) Int. Cl.
*H04B 7/02* (2006.01)
*H04L 1/02* (2006.01)

(52) U.S. Cl. .............. 375/267; 375/260; 375/299; 375/347; 455/101; 455/103; 455/69; 455/104

(58) Field of Classification Search .......... 375/267, 375/260, 299, 347; 455/101, 103, 69, 104
See application file for complete search history.

(56) References Cited

U.S. PATENT DOCUMENTS

| | | | |
|---|---|---|---|
| 7,123,887 B2 * | 10/2006 | Kim et al. | 455/103 |
| 2005/0181739 A1 * | 8/2005 | Krasny et al. | 455/69 |
| 2006/0098760 A1 * | 5/2006 | Shen et al. | 375/299 |
| 2007/0127360 A1 * | 6/2007 | Song et al. | 370/208 |
| 2007/0147414 A1 * | 6/2007 | Niu et al. | 370/465 |
| 2007/0147536 A1 * | 6/2007 | Melzer et al. | 375/267 |
| 2007/0160156 A1 * | 7/2007 | Melzer et al. | 375/260 |
| 2008/0086662 A1 * | 4/2008 | Li et al. | 714/704 |

OTHER PUBLICATIONS

IEEE Std 802.16-2004, Part 16: Air Interface for Fixed Broadband Wireless Access Systems, Oct. 2004, Section 8.4.8.3.

* cited by examiner

*Primary Examiner*—Phuong Phu

(57) ABSTRACT

A radio communications device (102) that has multiple receive antennas processes received data communications signals to select between space time coding and spatial multiplexing as a selected transmission technique from a base device (104) that has multiple transmit antennas. A channel throughput (402-412, 450-454) for each transmission technique is estimated based on signal to interference and noise ratios (502-512, 550-554) of signals being transmitted through a MIMO channel (140) as measured by a receiver (708). The transmission technique with the higher estimated throughput is determined. If spatial multiplexing is determined to have the higher estimated throughput and the throughput of each layer of the spatially multiplexed signal is greater than a threshold, spatial multiplexing is selected. Otherwise, space time coding is selected.

20 Claims, 7 Drawing Sheets

US 7,477,699 B2

TRANSMISSION TECHNIQUE SELECTOR FOR RADIO COMMUNICATION SYSTEMS WITH MULTIPLE TRANSMIT AND MULTIPLE RECEIVE ANTENNAS

FIELD OF THE INVENTION

This invention relates in general to wireless communication, and more specifically, to adapting transmission formats for multiple transmit and multiple receive antenna radio communications systems.

BACKGROUND OF THE INVENTION

Multiple input—multiple output (MIMO) radio communication techniques increase the throughput of a data communications system by taking advantage of multiple transmit and multiple receive antennas. MIMO radio communication systems include transmitters that each has multiple transmit antennas and receivers that each has multiple receive antennas. Two transmission techniques are commonly used for MIMO radio communications. One technique is based on space-time coding (STC) or Matrix A, which transmits only one data stream from a transmitter with multiple transmit antennas to a receiver with at least one receive antenna. The received signal to interference and noise ratio (SINR) of an STC system is improved due to the spatial diversity of the MIMO channel. Another technique used with MIMO radio communications sends separate streams of data from multiple transmitter antennas. Transmitting separate streams of data from each of multiple transmitter antennas located at a single transmitter is referred to as spatial multiplexing (SM) or Matrix B. Spatial multiplexing increases the overall transmitted data rate for a MIMO system. IEEE 802.16 standard defines the two MIMO techniques. However, no efficient method to select between the two is available.

Therefore a need exists to overcome the problems with the prior art as discussed above.

SUMMARY OF THE INVENTION

In accordance with one aspect of the present invention, a portable data processor and communications device includes a data interface that is adapted to at least one of receiving data from an external source and sending data to an external device. The portable data processor and communications device further includes a data processor that is communicatively coupled to the data interface and adapted to process the data. The portable data processor and communications device also includes an RF transmitter, an RF receiver, and a multiple antenna array that is adapted to provide an interface to a multiple transmit and multiple receive antennas radio channel. The portable data processor and communications device additionally includes a signal to interference and noise ratio estimator that is communicatively coupled to the RF receiver and that is adapted to estimate a first data throughput of the at least one multiple transmit and multiple receive antennas radio channel using the space time coding technique. The first data throughput estimate is based on a first signal to interference and noise ratio determined for at least one tone in the multiple transmit and multiple receive antennas radio channel using a space time coding technique. The signal to interference and noise ratio estimator also estimates a second data throughput of the at least one multiple transmit and multiple receive antennas radio channel corresponding to using the spatial multiplexing technique. The second data throughput estimate is based on a second signal to interference and noise ratio determined for at least one tone in a multiple transmit and multiple receive antennas radio channel using a spatial multiplexing technique. The spatial multiplexing technique communicates a plurality of data stream layers through the at least one multiple transmit and multiple receive antennas radio channel. The portable data processor and communications device also includes a transmission technique selector that is communicatively coupled to the signal to interference and noise ratio estimator and that is adapted to determine, based upon the first signal to interference and noise ratio and the second signal to interference and noise ratio, that the second data throughput is greater than the first data throughput and that the data throughput of each layer within the plurality of data stream layers is greater than a threshold. The transmission technique selector selects, in response to determining that the second data throughput is greater than the first data throughput and that the data throughput of each layer within the plurality of data stream layers is greater than a threshold, the spatial multiplexing technique as a selected technique. The transmission technique selector alternatively selects, in response to determining that the second data throughput is not greater than the first data throughput and that the data throughput of at least one layer of data streams based upon a second signal and interference ratio is not greater than the threshold, the space time coding technique as the selected technique. The portable data processor and communications device includes a data communications controller that is communicatively coupled to the transmission technique selector and the RF transmitter and that is adapted to communicate the selected technique and at least one corresponding channel quality indices to a transmitter through the RF transmitter.

In accordance with another aspect of the present invention, a method for selecting a multiple input multiple output transmission technique for a radio communication system with multiple transmit and multiple receive antennas includes estimating, based upon a first signal to interference and noise ratio determined for at least one tone in a multiple transmit and multiple receive antennas radio channel using a space time coding technique, a first data throughput of the at least one multiple transmit and multiple receive antennas radio channel using the space time coding technique. The method further includes estimating, based upon a second signal to interference and noise ratio determined for at least one tone in a multiple transmit and multiple receive antennas radio channel using a spatial multiplexing technique, a second data throughput of the at least one multiple transmit and multiple receive antennas radio channel corresponding to using the spatial multiplexing technique. The spatial multiplexing technique communicates a plurality of data stream layers through the at least one multiple transmit and multiple receive antennas radio channel. The method also includes determining, based upon the first signal to interference and noise ratio and the second signal to interference and noise ratio, that the second data throughput is greater than the first data throughput and that the data throughput of each layer within the plurality of data stream layers is greater than a threshold. The method additionally includes selecting, in response to determining that the second data throughput is greater than the first data throughput and that the data throughput of each layer within the plurality of data stream layers is greater than a threshold, the spatial multiplexing technique as a selected technique, or selecting, in response to determining that the second data throughput is not greater than the first data throughput and that the data throughput of at least one layer of data streams based upon a second signal and interference ratio is not greater than the threshold, the space time coding technique as the selected technique. The method further includes communicating the selected technique and at least one corresponding channel quality indices to a transmitter.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Figure 1:
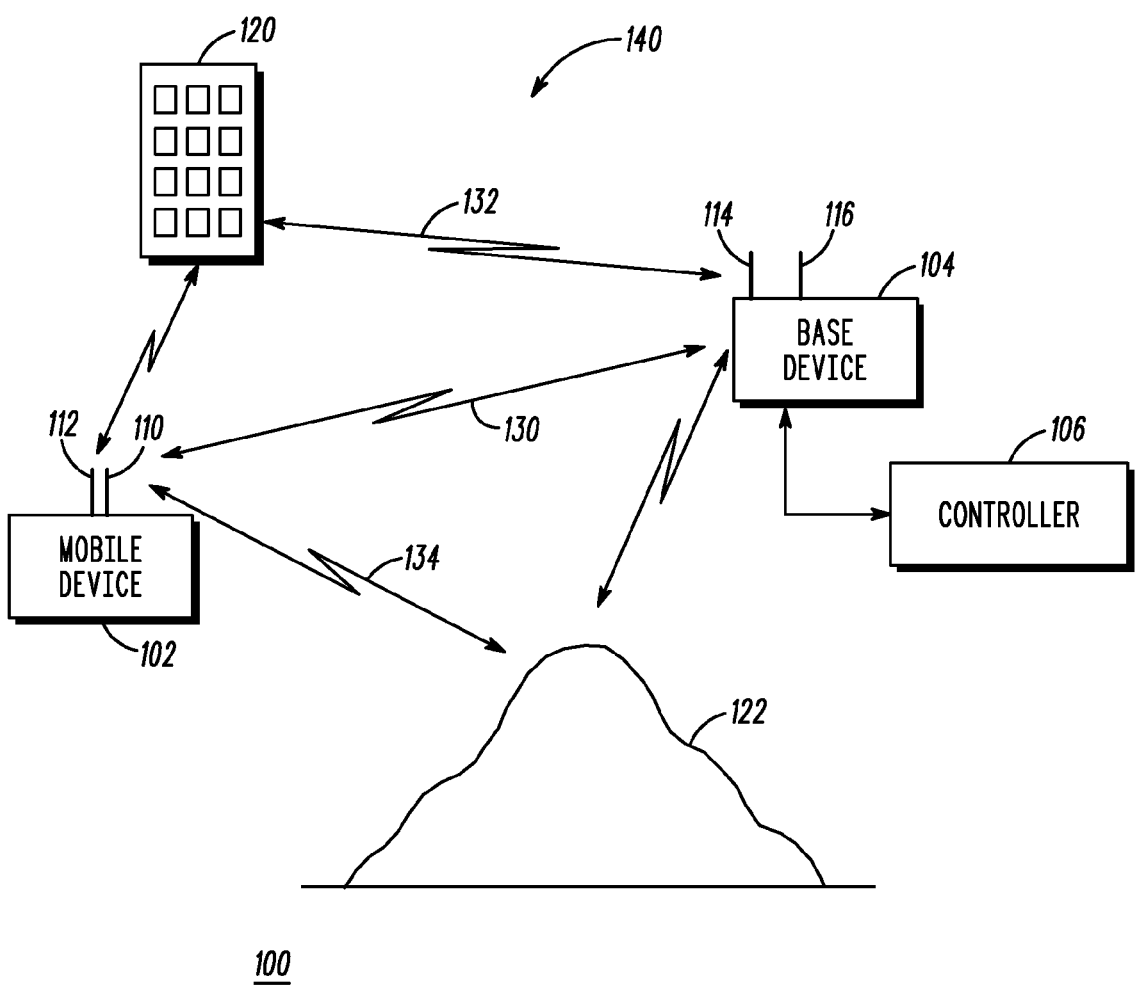
FIG. 1 is a block diagram illustrating a wireless communication network including a multiple transmit and multiple receive antennas radio channel with multipath propagation, as is utilized by one embodiment of the present invention.

FIG. 1 is a block diagram illustrating a wireless communication network 100 including a multiple transmit and multiple receive antennas radio channel with multipath propagation, as is utilized by one embodiment of the present invention. A multiple transmit and multiple receive antennas radio channel is a channel shared between a transmitter having multiple transmit antennas and a receiver having multiple receive antennas. The wireless communications network 100 of this example illustrates a mobile device 102 and a base device 104. The mobile device 102 and base device 104 are each able to transmit and receive radio communications signals to provide bi-directional wireless data communications between each other and/or other wireless communications devices. For simplicity of description, the current example illustrates communication from the base device 104 to the mobile device 102. It is easily understood by one of ordinary skill in the art that data communication from the mobile device 102 to the base device is performed in a manner similar to that described below. It is also to be understood that the base device 104 of the current example is able to communicate with a number of mobile devices 102 and other data communications devices.

The mobile device 102 in FIG. 1 has two antennas, a first antenna 110 and a second antenna 112. The first antenna 110 and second antenna 112 are each electrically connected to radio transmitter and receiver circuits to allow each antenna to transmit radio signals and to receive radio signals. The base device 104 similarly has a first base antenna 114 and a second base antenna 116 that are each electrically connected to radio transmitter and receiver circuits to allow both transmission and reception by each antenna.

The base device 104 is communicatively coupled to a controller 106. Controller 106 performs various network management functions including those performed by conventional wireless data networks. The controller 106 further controls the Multiple Input—Multiple Output (MIMO) transmission technique to be used for wireless communications between each mobile device 102 and the base device 104. As described in detail below, calculations performed by each receiving device, i.e., the receivers at both the mobile device 102 and the base device 104, are used to select the MIMO transmission technique to be used for each data communication link. The receivers communicate the selected MIMO transmission technique to be implemented by each mobile device to the controller 106. The controller, in turn, issues commands to the base device 104 and mobile device 102 to use the selected MIMO transmission technique.

The wireless communications network 100 includes an RF propagation channel 140 that includes several RF paths. The RF propagation channel 140 is a multiple transmit and multiple receive antennas radio channel because the RF propagation channel 140 has multiple transmit antennas, first base antenna 114 and second base antenna 116, to transmit RF inputs to the radio channel 140. The mobile device 102 further has multiple receive antennas, the first antenna 110 and the second antenna 112, which receive RF signals from the RF propagation channel 140. The configuration of the base device 102, the RF propagation channel 140 and the base device 104 forms a Multiple Input—Multiple Output RF transmission system.

The RF propagation channel 140 is shown to have two reflected transmission paths, first reflected transmission path 132 that include RF signals reflected by a building 120, and a second reflected transmission path 134 that includes RF signals reflected by a mountain 122. These multiple reflected transmission paths convey transmitted RF energy between the base device 104 and the mobile device 102. The RF propagation channel 140 of this example is also shown to have a direct propagation path 130 between the mobile device and the base device. Such a direct propagation path 130 is not required for operation of this embodiment and many operational circumstances do not include such a direct propagation path 130. The multiple RF paths (first reflected path 132, second reflected path 134 and direct propagation path 130) form an RF channel with multipath propagation.

Figure 2:
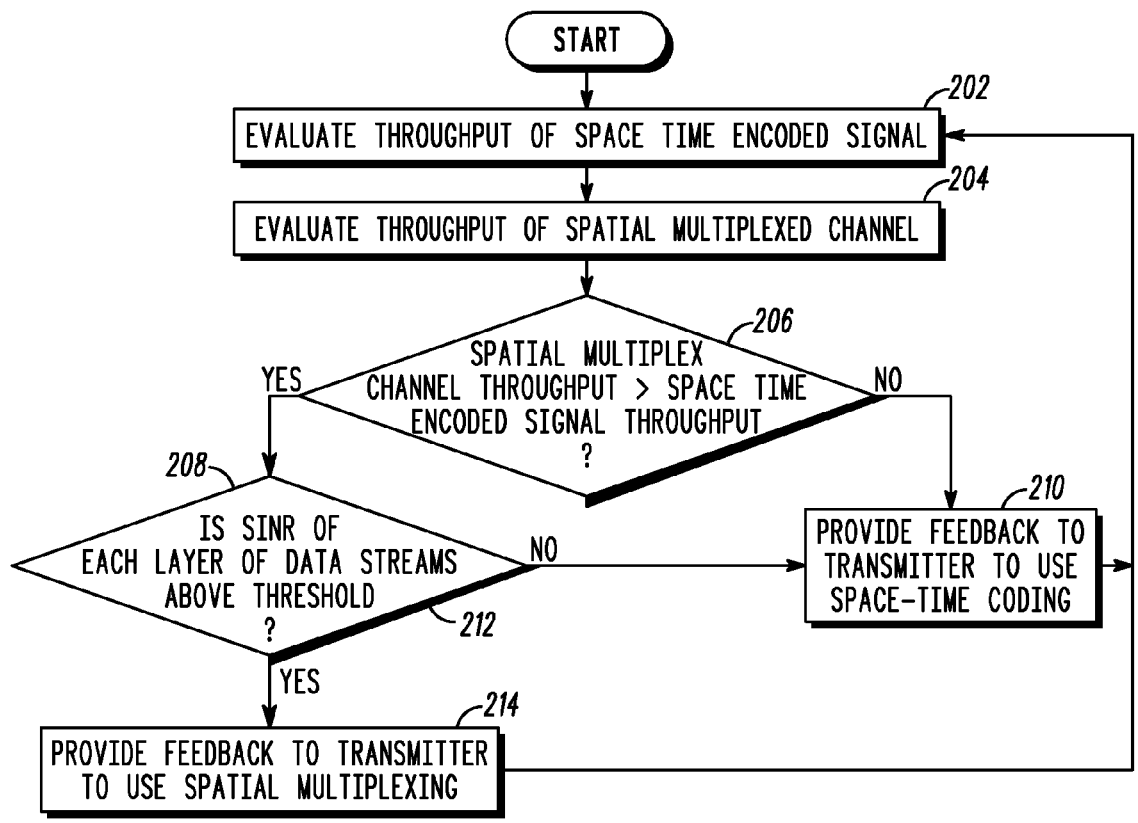
FIG. 2 illustrates a MIMO transmission technique selection processing flow in accordance with one embodiment of the present invention.

FIG. 2 illustrates a MIMO transmission technique selection process 200, in accordance with one embodiment of the present invention. The process 200 is performed by a MIMO receiver, such as is included in the mobile device 102 or the base device 104, to select a preferred MIMO transmission technique given currently observed radio channel conditions. In one embodiment, the receiver performing the process 200 selects between space time encoding and spatial multiplexing.

The process 200 begins by evaluating, at step 202, the data throughput of a space time encoded signal that is communicating data between a transmitter and a receiver through a MIMO radio channel with multiple transmit and multiple receive antennas. Determination of the throughput of a space time encoded signal is described in detail below. At step 204, the process evaluates the data throughput of a spatially multiplexed signal that is communicating data between a transmitter and a receiver through a MIMO radio channel with multiple transmit and multiple receive antennas. Determination of the throughput of a space time encoded signal is described in detail below.

At step 206, the process 200 determines whether the spatially multiplexed throughput of the radio channel is greater than the space time encoded throughput of the channel. If the spatially multiplexed throughput of the radio channel is greater than the space time encoded throughput of the channel, the processing continues by determining, at step 208, whether the data throughput of each layer of data streams is greater than a threshold. The data throughput is computed based on a signal to interference and noise ratio for the spatially multiplexed signal through the radio channel. If the data throughput of each layer of data streams is greater than the threshold, the process provides feedback to the transmitter to use spatial multiplexing for the data transmission (step 214).

If it was determined, at step 206, that the spatially multiplexed throughput of the radio channel is not greater than the space time encoded throughput of the channel, or it was determined that the data throughput of each layer of data streams was less than the predetermined threshold, the process provides feedback to the transmitter to use space time encoding for the data transmission (step 210).

Figure 3:
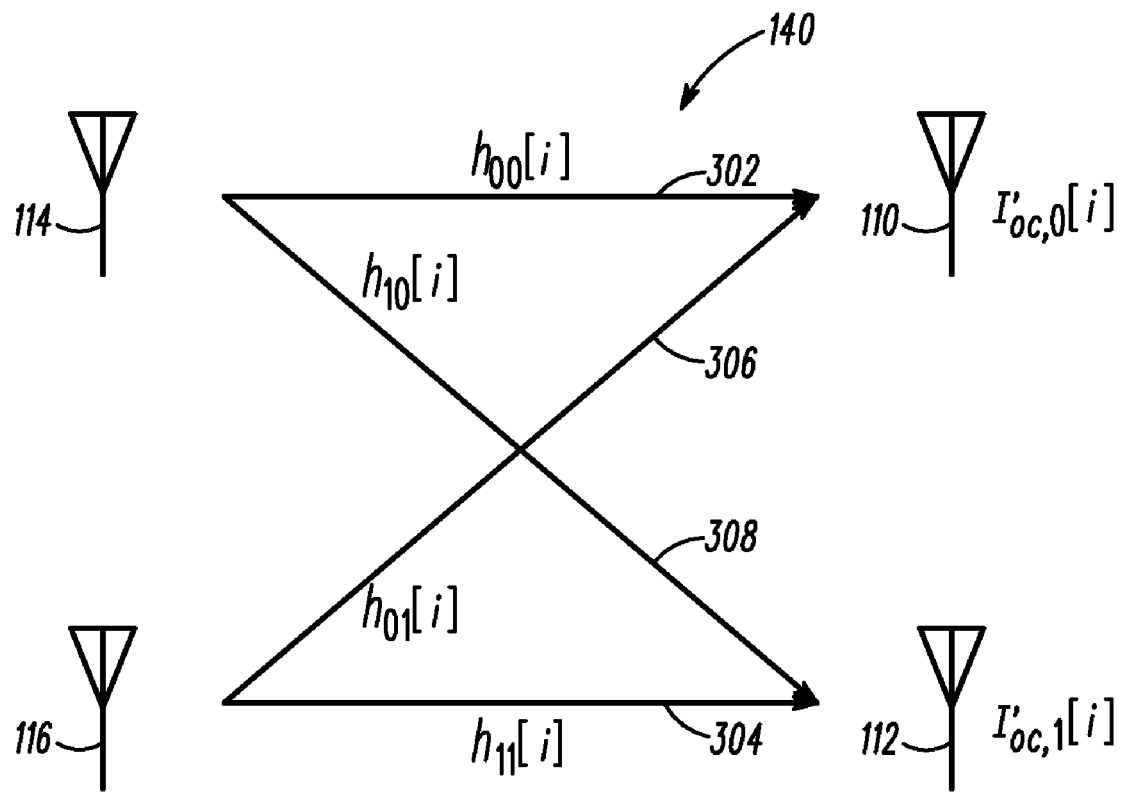
FIG. 3 illustrates a multiple transmit and multiple receive antennas radio channel in accordance with one embodiment of the present invention.

FIG. 3 illustrates a multiple transmit and multiple receive antennas radio channel 300 in accordance with one embodiment of the present invention. The multiple transmit and multiple receive antennas radio channel 300 illustrates two transmit antennas, first base antenna 114 and second base antenna 116, as well as two receive antennas, first antenna 110 and second antenna 112. The RF propagation channel 140 is represented for each transmitted tone conveyed through the RF propagation channel 140 by four coupling paths between the two pairs of antennas. A first coupling path $h_{00}[i]$ 302 represents coupling between the first base antenna 114 and the first antenna 110 for a particular tone [i]. A second coupling path $h_{11}[i]$ 304 represents coupling between the second base antenna 116 and the second antenna 112 for a particular tone [i]. A third coupling path $h_{01}[i]$ 306 represents coupling, for a particular tone [i], between the second base antenna 116 and the first antenna 110. A fourth coupling path $h_{10}[i]$ 308 represents coupling, for a particular tone [i], between the first base antenna 114 and the second antenna 112. The first received signal, $I'_{oc,0}[i]$, for each transmitted tone "i" is present at the first antenna 110 and a second received signal, $I'_{oc,1}[i]$, for each transmitted tone "i" is present at the second antenna 112. One embodiment of the present invention includes processing at a MIMO receiver to estimate these channel response values.

Figure 4:
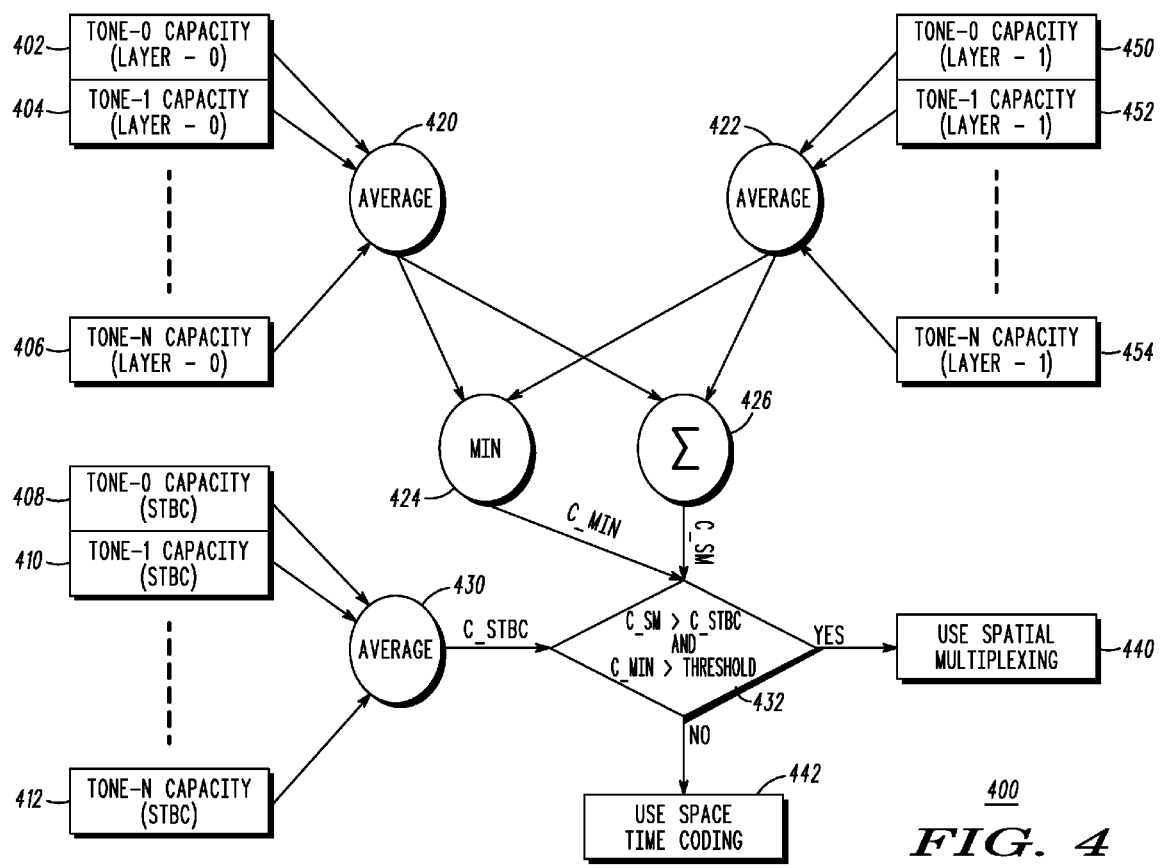
FIG. 4 illustrates a first selection of MIMO technique processing flow in accordance with one embodiment of the present invention.

FIG. 4 illustrates a first MIMO technique selection process 400, in accordance with one embodiment of the present invention. The process 400 includes a first processing option for evaluating the throughput capacities of a MIMO RF channel communications for either a space time encoded signal or a spatially multiplexed signal.

The process 400 illustrates an estimated tone-0 of layer 0 throughput 402 of a first spatially multiplexed signal. An estimated tone-1 of layer 0 throughput 404 and an estimated tone-n of layer 0 throughput 406 of the first spatially multiplexed signal are also illustrated. Estimated capacities of tone 0 of layer 1 450, tone 1 of layer 1 452 and tone n of layer 1 454 are also shown. Layer 0 and layer 1 represent the two data stream layers used by a spatially multiplexed signal being communicated through the RF propagation channel 140. It is clear that estimated capacities for tones 2 through (n−1) of both layer 0 and layer 1 are also present but not illustrated in order to improve the clarity and generality of this description. Calculation of these estimated tone capacities is described in detail below.

The estimated capacities of all tones of layer 0 are averaged 420 and the estimated capacities of all tones of layer 1 are averaged 422. The two averages are provided to a Minimum function 424 and a summation function 426. The Minimum function 424 produces a C_MIN value and the summation function 426 produces a C_SM value, which are compared to values derived from estimates of throughput for space time encoded signals, as is described below.

The process 400 illustrates an estimated throughput for tone-0 for a Space Time Block Code (STBC) signal 408 propagating through the RF propagation channel 140. Estimated capacities of tone-1 of an STBC signal 410 and an estimated tone-n of an STBC signal 412 are also illustrated. Estimated capacities for tones 2 through (n−1) of the STBC signal are also present but not illustrated in order to improve the clarity and generality of this description. The estimated capacities of all of the tones of the STBC signal are averaged 430 to produce a C_STBC value. A decision 432 as to whether C_SM is greater than C_STBC and whether C_MIN is greater than a threshold is made. If this decision is true, the process selects spatial multiplexing 440. If the decision is false, the process selects space time encoding 442. The tone throughput is calculated based on a formula, an example of which is described below.

Figure 5:
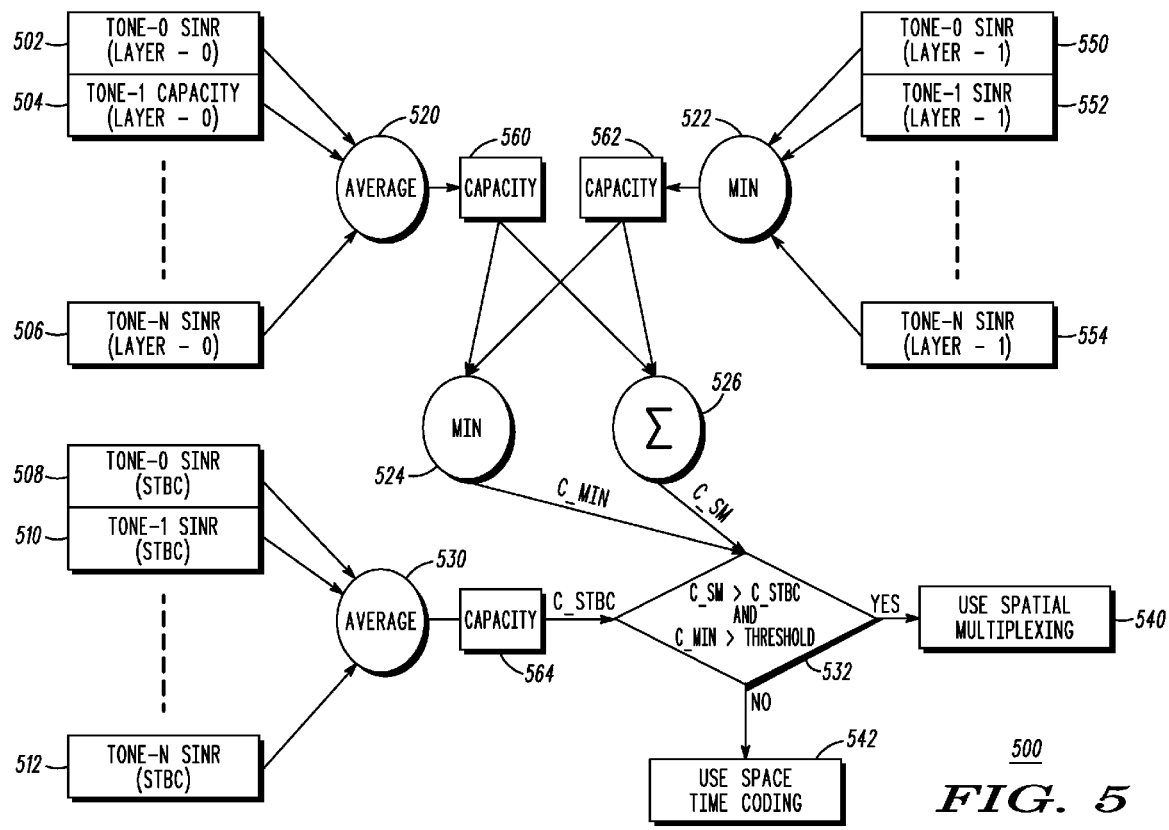
FIG. 5 illustrates a second selection of MIMO technique processing flow in accordance with one embodiment of the present invention.

FIG. 5 illustrates a second MIMO technique selection process flow 500, in accordance with one embodiment of the present invention. The second process flow 500 includes another processing option for determining the throughput capacities of a MIMO RF channel for both a space time encoded signal and a spatially multiplexed signal. In contrast to the first selection process flow 400, the second selection process flow 500 performs a less computationally intense processing to estimate the data throughput of the RF propagation channel 140 for space time encoded and spatially multiplexed signals. The selection of a MIMO modulation technique is then based on these more efficiently calculated channel throughput estimates. The channel throughput is calculated based on a formula, an example of which is described below.

The second MIMO technique selection process 500 illustrates a tone-0 of layer 0 SINR 502 of a first spatially multiplexed signal. A tone-1 of layer 0 SINR 504 and a tone-n of layer 0 SINR 506 of the first spatially multiplexed signal are also illustrated. SINRs of tone 0 of layer 1 550, tone 1 of layer 1 552 and tone n of layer 1 554 are also shown. As above, layer 0 and layer 1 represent the two data stream layers used by a spatially multiplexed signal being communicated through the RF propagation channel 140. It is clear that SINRs for tones 2 through (n−1) of both layer 0 and layer 1 are also present but not illustrated in order to improve the clarity and generality of this description.

The SINRs of all tones of layer 0 are first averaged 520 and this signal average value is used to determine a layer 0 estimated throughput 560, as is described below. The SINRs of all tones of layer 1 are also averaged 522 and that average is used to determine a layer 1 estimated throughput 562. The two averages are processed in a manner similar to that described above for the first MIMO technique selection process 400. The two averages are provided to a Minimum function 524 and a summation function 526. The Minimum function 524 produces a C_MIN value and the summation function 526 produces a C_SM value, which are compared to values derived from estimates of throughput for space time encoded signals, as is described below.

The second MIMO technique selection process 500 further illustrates SINRs of tone-0 for a STBC signal 508 propagating through the RF propagation channel 140, SINRs for tone-1 510 and tone N 512 of an STBC signal. SINRs for tones 2 through (n—1) of the STBC signal are also present but not illustrated in order to improve the clarity and generality of this description. The SINRs of all tones of the STBC signal are averaged 530 and used to determine an STBC estimated throughput 564 represented by a C_STBC value. A decision 532 as to whether C_SM is greater than C_STBC and if C_MIN is greater than a threshold is made. If this decision is true, the process selects spatial multiplexing 540. If the decision is false, the process selects space time coding 542.

The above described processing includes determining a per tone SINR. A non-limiting example of processing used by one embodiment to determine the per-tone SINR is described below. Further embodiments are able to use any suitable method to determine or estimate per-tone SINR values for use in the above described processing.

In one example, based upon the 2×2 MIMO channel illustrated for the multiple transmit and multiple receive antennas radio channel 300 as is shown in FIG. 3, a received signal, denoted as the vector containing $r_0[i]$ and $r_1[i]$, of an Orthogonal Frequency Division Multiplexed (OFDM) data communications system is denoted as follows:

$$\begin{bmatrix} r_0[i] \\ r_1[i] \end{bmatrix} = \begin{bmatrix} h_{00}[i] & h_{01}[i] \\ h_{10}[i] & h_{11}[i] \end{bmatrix} \cdot \begin{bmatrix} s_0[i] \\ s_1[i] \end{bmatrix} + \begin{bmatrix} n_0[i] \\ n_1[i] \end{bmatrix}$$

where $n_0[i]$ and $n_1[i]$ are the interference and noise signals received by the two receive antennas, respectively. The variance of $n_0[i]$ and $n_1[i]$ is signified below by $\sigma_0^2$. One embodiment of the present invention includes processing within a receiver to estimate the channel response represented by $h_{00}[i]$, $h_{01}[i]$, $h_{10}[i]$, and $h_{11}[i]$ through conventional techniques.

The SINR of each tone of a space time encoded signal is given by the following relationship, where "i" represents the individual tones:

$$SINR^{STC}[i] = \sum_{RX=0}^{1} \sum_{TX=0}^{1} \frac{|h_{RX,TX}[i]|^2 \cdot P_{TX}[i]}{\sigma_0^2}$$

where $P_{TX}[i]$ is the transmit power on i-th subcarrier tone transmitted from a respective transmit antenna denoted by "TX." In this example, each SINR of the respective tones using the space time coding technique is calculated based on an estimated channel response and comprises a summation of SINRs for the respective tones from one of two transmit antennas to one of two receive antennas.

In the case of a spatially multiplexed signal, a Minimum Mean Square Error (MMSE) based receiver will produce SINR values for a first of the two layers of the transmitted data streams of the spatially multiplexed signal according to the following equation:

$$SINR_0^{SM}[i] = SINR_0'^{SM}[i] \cdot \left(1 - \frac{L[i]}{1 + \frac{1}{SINR_1'^{SM}[i]}}\right).$$

The above equation determines the SINR of each respective tone of the first data stream layer by multiplying an individualized SINR for the respective tone within the first data stream layer, which is represented by $SINR'^{SM}_0$, by a correction factor consisting of one minus a normalized correlation between the first data stream layer and the second data stream layer that is divided by one plus a reciprocal of an individualized SINR for the respective tone within the second data stream layer. The SINR values for a second of the two layers of the transmitted data streams of the spatially multiplexed signal are produced according to the following equation:

$$SINR_1^{SM}[i] = SINR_1'^{SM}[i] \cdot \left(1 - \frac{L[i]}{1 + \frac{1}{SINR_0'^{SM}[i]}}\right).$$

The above equation determines the SINR of each tone of the second data stream layer by multiplying the individualized SINR for a respective tone within the second data stream layer by a second correction factor consisting of one minus a normalized correlation between the first data stream layer and the second data stream layer that is divided by one plus a reciprocal of the individualized SINR for a respective tone within the first data stream layer.

The normalized correlation between the first data stream layer and the second data stream layer, represented by L[i] above, defines a correlation between the first data stream layer and the second data stream layer that is defined by:

$$L[i] = \frac{\left|\sum_{i=0}^{1} h_{i0}^*[i] \cdot h_{i1}[i]\right|^2}{\left(\sum_{i=0}^{1} h_{i0}^*[i] \cdot h_{i0}[i]\right) \cdot \left(\sum_{i=0}^{1} h_{i1}^*[i] \cdot h_{i1}[i]\right)}.$$

An "individualized SINR for a respective tone within a data stream layer" is defined for the first and second data stream layers, respectively, by:

$$SINR_0'^{SM}[i] = \sum_{RX=0}^{1} \frac{|h_{RX,0}[i]|^2 \cdot P_0[i]}{\sigma_0^2}$$

and $$SINR_1'^{SM}[i] = \sum_{RX=0}^{1} \frac{|h_{RX,1}[i]|^2 \cdot P_1[i]}{\sigma_0^2}.$$

The first individualized SINR includes a summation of terms wherein each term within the terms relates to a respective receive antenna within the multiple receive antennas. Each term includes a product of a transmitted power on the tone and a square of the magnitude of a channel frequency response from a first transmit antenna associated with the first data stream to the respective receive antenna within the multiple receive antennas. The product being divided by a variance of interference and noise values of the multiple receive antennas radio channel.

The second individualized SINR includes a summation of terms wherein each term within the terms relates to a respective receive antenna within the multiple receive antennas. Each term includes a product of a transmitted power on the tone and a square of the magnitude of a channel frequency response from a second transmit antenna associated with the second data stream to the respective receive antenna within the multiple receive antennas. The product being divided by a variance of interference and noise values of the multiple receive antennas radio channel.

The instantaneous throughput of a MIMO data communications system can be estimated according to the following equation.

$$T = A \cdot \log_2(1 + B \cdot SINR)$$

where A and B are between 0 and 1, and are parameters to model the non ideality of the error control coding (FEC). These parameters can be chosen to correspond to a specific, for example 10%, frame erasure rate (FER).

The first MIMO technique selection process 400 and second MIMO technique selection process 500 illustrate two alternative processes that are used to estimate the throughput of a MIMO channel for signals utilizing either space time encoding or spatial multiplexing. The first method of determining channel throughput calculates the expected throughput of a channel for space time encoding and spatial multiplexing based upon the per-tone SINR for each of the two transmission techniques. As an example based upon using a highest modulation and coding rate of the IEEE 802.16e standard of 5.0 bits/symbol and using, for example, 64-QAM with 5/6 coding, the throughput for space time encoding ($T_{STC}$) and spatial multiplexing ($T_{SM}$) are provided below. In one embodiment, the estimated throughput for space time encoding is based upon multiple logarithm calculations with each logarithm calculation including a logarithm of a term containing a SINR of a respective tone within the space time coding technique, as is provided by the following equation:

$$T_{STC} = \sum_{i=1}^{K} \min(A \cdot \log_2(1 + B \cdot SINR^{STC}[i]), 5.0).$$

The estimated throughput for spatial multiplexing is based upon multiple logarithm calculations with each logarithm calculation including a logarithm of a term containing a SINR of a respective tone within the spatial multiplexing technique, as is provided by the following equation:

$$T_{SM} = T_{SM}^0 + T_{SM}^1$$
$$= \sum_{i=0}^{K-1} \min(A \cdot \log_2(1 + B \cdot SINR_0^{MIMO}[i]), 5.0) +$$
$$\sum_{i=0}^{K-1} \min(A \cdot \log_2(1 + B \cdot SINR_1^{MIMO}[i]), 5.0)$$

where K in each of the above equations is the number of data subcarriers in one OFDM symbol.

The above requires calculation of a logarithm for each transmitted tone. The calculation of these logarithm values for each tone of a MIMO system may place a high computational burden on a processor to determine which transmission technique is to be selected.

The second MIMO technique selection process 500 illustrates a second manner of estimating channel throughput for the two candidate transmission techniques. This second process introduces a simplification to the calculation to reduce the number of logarithm calculations required to estimate a channel throughput.

The second process defines an average of SINRs for all K tones within a space time encoded signal as:

$$\overline{SINR}^{STC} = \frac{1}{K} \sum_{i=0}^{K-1} SINR^{STC}[i].$$

With the above definition of an average SINR for all tones within a space time encoded signal, the throughput of the signal can be estimated based upon one logarithm calculation of an average of SINRs of at least two tones within the space time coding technique according to the following equation, with K, A and B defined as above:

$$T_{STC} = K \cdot \min(A \cdot \log_2(1 + B \cdot \overline{SINR}^{STC}), 5.0).$$

The average of SINRs for all K tones within each of the two data stream layers of one embodiment are defined as:

$$\overline{SINR}_0^{SM} = \frac{1}{K} \sum_{i=0}^{K-1} SINR_0^{SM}[i]$$

$$\overline{SINR}_1^{SM} = \frac{1}{K} \sum_{i=0}^{K-1} SINR_1^{SM}[i]$$

With the above definition of an average SINR for all tones within a spatial multiplexed signal, the throughput of that spatially multiplexed signal can be estimated based upon one logarithm calculation of an average of SINRs of at least two tones within each data stream of the spatial multiplexing technique according to the following equation, with K, A and B defined as above:

$$T_{SM} = T_{SM}^0 + T_{SM}^1$$
$$= K \cdot \min(A \cdot \log_2(1 + B \cdot \overline{SINR}_0^{SM}), 5.0) +$$
$$K \cdot \min(A \cdot \log_2(1 + B \cdot \overline{SINR}_1^{SM}), 5.0)$$

The first MIMO technique selection process 400 and second MIMO technique selection process 500 further illustrate that for both, a necessary condition for selecting spatial multiplexing is:

$$T_{STC} \leq T_{SM}.$$

In addition to the above condition, the received SINR of each data stream layer for the spatially multiplexed signal should not be so low as to prevent reliable reception of that data stream. In other words, a second condition for selecting spatially multiplexed MIMO over space time encoding is:

$$\frac{\min(T_{SM}^0, T_{SM}^1)}{K} \geq \Psi$$

where $\Psi$ is a pre-determined threshold.

One embodiment of the present invention selects the spatial multiplexing transmission technique if the above two conditions are satisfied. A mobile device 102 that determines that these two conditions are satisfied communicates that selection to the base device 104 for communication to the controller 106. If any one of the above two conditions is not satisfied, the space time coding technique is selected and that selection is communicated to the controller 106.

In order for the scheduler, which commonly resides at a base station controller 106, to choose a suitable modulation and FEC coding rate for transmission, a mobile device is able to transmit as a feedback to the scheduler a channel quality index (CQI) in addition to the MIMO mode selection. This CQI feedback depends on the selected MIMO mode, and reflects the effectively received SINR. For spatial multiplexing MIMO, the CQI is determined in one embodiment according to $$SINR_{EQ}^{SM} = \frac{2^{\frac{T_{SM}}{2 \cdot K \cdot A}} - 1}{B}.$$

In another embodiment of CQI for spatial multiplexing MIMO, two CQIs can be returned as feedback that correspond to two data streams, respectively $$SINR_{EQ,0}^{SM} = \frac{2^{\frac{T_{SM}^0}{2 \cdot K \cdot A}} - 1}{B}$$

and $$SINR_{EQ,1}^{SM} = \frac{2^{\frac{T_{SM}^1}{2 \cdot K \cdot A}} - 1}{B}.$$

For MIMO transmissions using space time encoding, the CQI is determined according to the following equation:

$$SINR_{EQ}^{STC} = \frac{2^{\frac{T_{STC}}{K \cdot A}} - 1}{B}.$$

Figure 6:
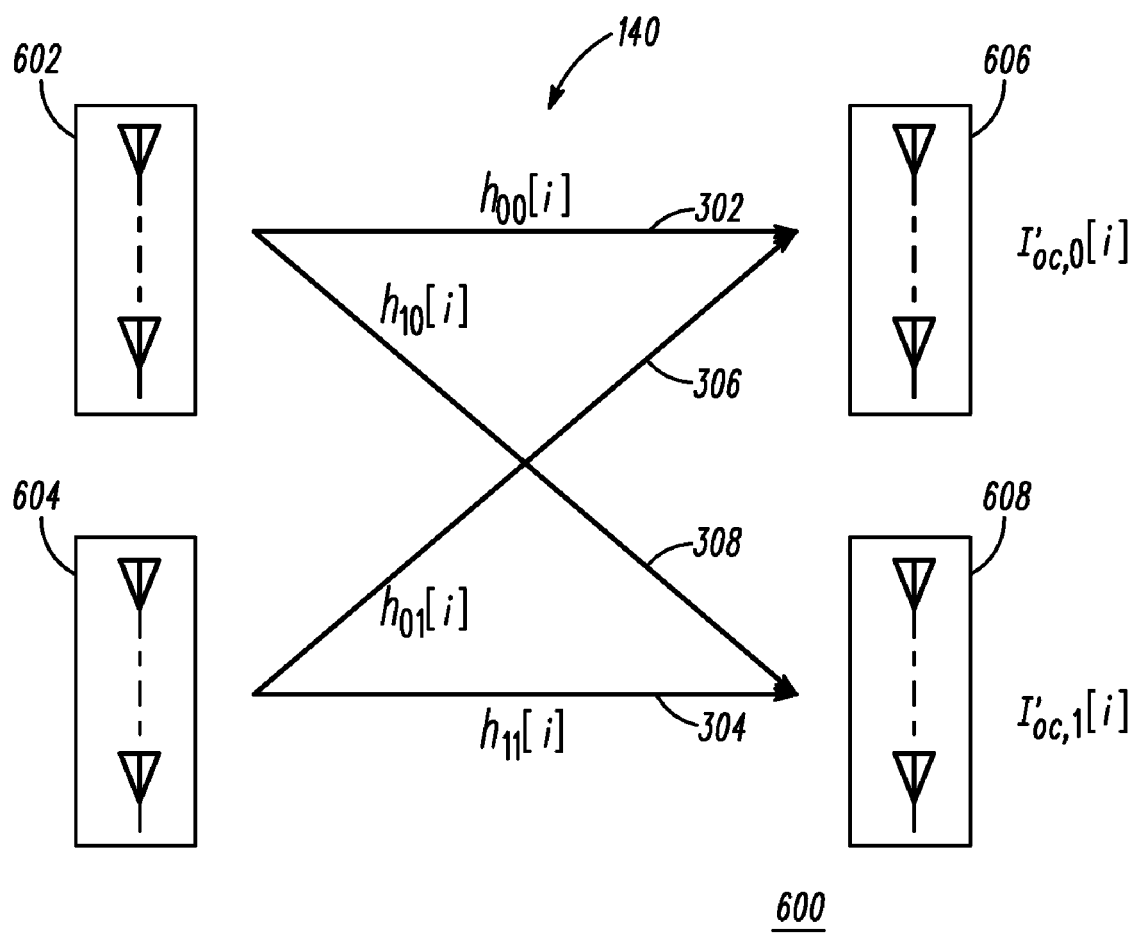
FIG. 6 illustrates a grouping of one or more transmit antennas to form a virtual transmit antenna and another grouping of one or more receive antennas to form a virtual receive antenna, in accordance with an alternative embodiment of the present invention.

FIG. 6 illustrates a grouping 600 of one or more transmit antennas to form a virtual transmit antenna and another grouping of one or more receive antennas to form a virtual receive antenna, in accordance with an alternative embodiment of the present invention. A first virtual transmit antenna 602 consists of a number of transmit antennas that are grouped together in a conventional manner. A second virtual transmit antenna 604 similarly consists of a number of transmit antennas that are grouped together in a conventional manner. Both first virtual transmit antenna 602 and second virtual antenna 604 are used to transmit a data stream. In the current example, the data streams are transmitted over RF propagation channel 140 to the two virtual antennas in a manner similar to that described in detail above.

The data transmitted over RF propagation channel 140 is received by a first virtual receive antenna 606 and a second virtual receive antenna 608. The first virtual receive antenna 606 consists of a number of receive antennas that are grouped together in a conventional manner. The second virtual receive antenna 608 similarly consists of a number of receive antennas that are grouped together in a conventional manner. In some embodiments, the antennas that make up virtual receive antennas and virtual transmit antennas are able to perform both transmit and receive functions to perform bi-directional wireless communications.

Figure 7:
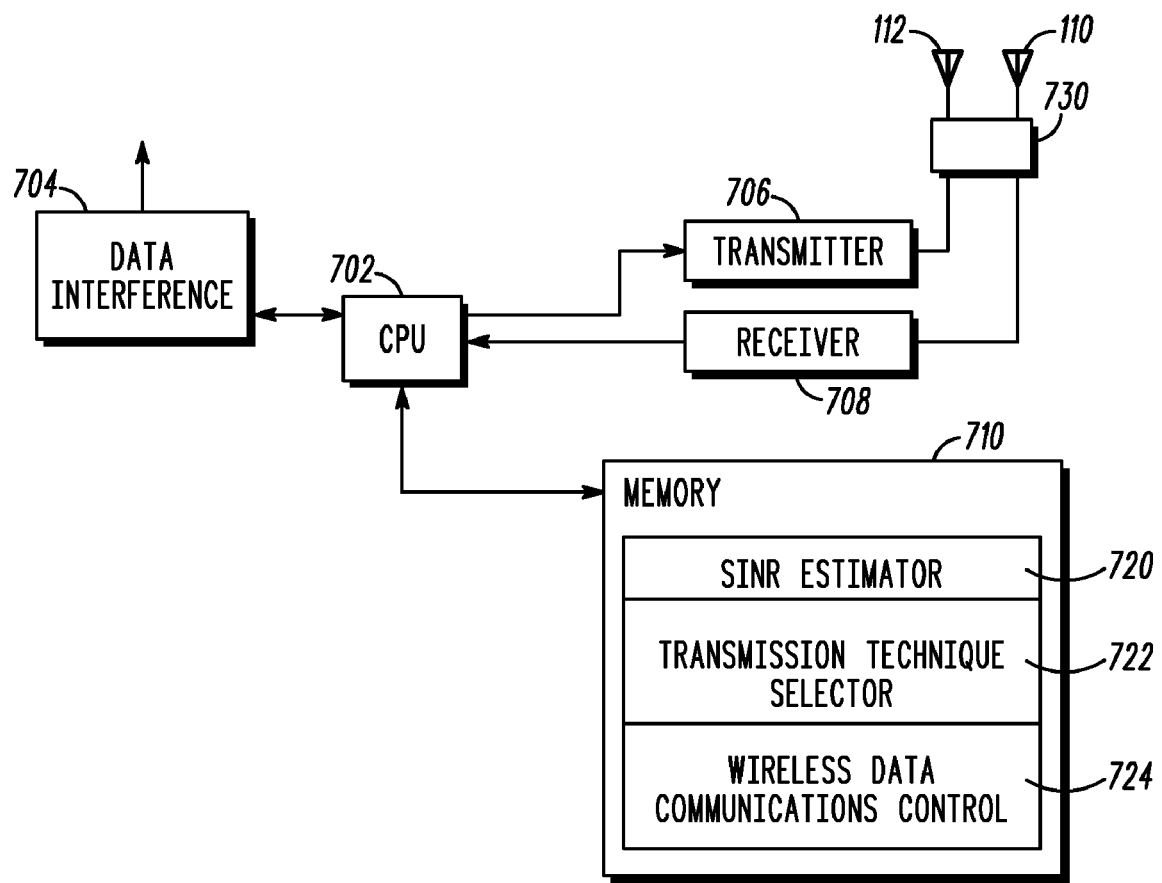
FIG. 7 illustrates a wireless communications device, in accordance with an alternative embodiment of the present invention.

FIG. 7 illustrates a wireless communication device 700, in accordance with an alternative embodiment of the present invention. Wireless communication device 700 includes first antenna 110 and second antenna 112. These two antennas are connected to an antenna interface 730 that performs RF distribution and control to the various antennas of the wireless communication device 700 in a conventional manner. The antenna interface 730 provides an RF connection between the antennas and a transmitter 706 and receiver 708. The transmitter 706 accepts data to be transmitted from a CPU 702 and the receiver 708 provides received and decoded data to the CPU 702. CPU 702 is able to receive data from an external source and send data to an external device.

CPU 702 is in electrical communication with a memory 710. Memory 710 stores various computer programs that control the processing performed by CPU 702. The memory 710 includes a SINR estimator program 720, a transmission technique selector program 722 and a wireless data communications control program 724. These programs control the operation of CPU 702 to perform the respective processing for various functions performed within the wireless communication device 700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for selecting a multiple input multiple output transmission technique for a radio communication system with multiple transmit and multiple receive antennas, the method comprising:

estimating, based upon a first signal to interference and noise ratio determined for at least one tone in a multiple transmit and multiple receive antennas radio channel using a space time coding technique, a first data throughput of the at least one multiple transmit and multiple receive antennas radio channel using the space time coding technique;

estimating, based upon a second signal to interference and noise ratio determined for at least one tone in a multiple transmit and multiple receive antennas radio channel using a spatial multiplexing technique, a second data throughput of the at least one multiple transmit and multiple receive antennas radio channel corresponding to using the spatial multiplexing technique, wherein the spatial multiplexing technique communicates a plurality of data stream layers through the at least one multiple transmit and multiple receive antennas radio channel;

determining, based upon the first signal to interference and noise ratio and the second signal to interference and noise ratio, that the second data throughput is greater than the first data throughput and that a third data throughput of each layer within the plurality of data stream layers is greater than a threshold;

selecting, in response to determining that the second data throughput is greater than the first data throughput and that the third data throughput of each layer within the plurality of data stream layers is greater than a threshold, the spatial multiplexing technique as a selected technique;

selecting, in response to determining that at least one of the second data throughput is not greater than the first data throughput and that the third data throughput of at least one layer of data streams based upon the second signal to interference and noise ratio is not greater than the threshold, the space time coding technique as the selected technique; and communicating by a receiver, the selected technique and at least one corresponding channel quality indices to a transmitter.

2. The method of claim 1, wherein the threshold is predetermined.

3. The method of claim 1, wherein the space time coding technique consists of coordinating multiple transmit antennas to transmit one layer of data stream.

4. The method of claim 1, further comprising:
determining, at the transmitter and based upon receipt of a negative acknowledgement, a need to retransmit a data packet that was communicated using the spatial multiplexing technique;
determining that a plurality of data streams of the spatial multiplexing technique received a negative acknowledgement; and
changing, in response to determining that a plurality of data streams received a negative acknowledgement, to the space time coding technique.

5. The method of claim 1, further comprising:
determining, at the receiver, at least one corresponding channel quality index based on the selected technique and a respective estimated channel throughput for the selected technique; and
communicating the at least one corresponding channel quality index to the transmitter.

6. The method of claim 1, wherein the multiple transmit and multiple receive antennas radio channel comprises at least one of a virtual transmit antenna and a virtual receive antenna, the virtual transmit antenna comprising a plurality of transmit antennas at a transmitter and the virtual receive antenna comprising a plurality of receive antennas at a receiver.

7. The method of claim 1, wherein the estimating the first data throughput is based upon a plurality of logarithms, each logarithm within the plurality of logarithms comprising a logarithm of a term comprising a signal to interference and noise ratio of a respective tone within the space time coding technique.

8. The method of claim 7, wherein each signal to interference and noise ratio of the respective tones within each data stream of the space time coding technique is calculated based on an estimated channel response and comprises a summation of signal to interference and noise ratios for the respective tones from one of two transmit antennas to one of two receive antennas.

9. The method of claim 1, wherein the estimating the second data throughput is based upon a plurality of logarithms, each logarithm within the plurality of logarithms comprising a logarithm of a term comprising a signal to interference and noise ratio of a respective tone within each data stream of the spatial multiplexing technique.

10. The method of claim 9, wherein the plurality of data stream layers comprises a first data stream layer and a second data stream layer, wherein the signal to interference and noise ratio of each tone within each data stream layer of the plurality of data stream layers is calculated based on estimated channel response, and wherein the signal to interference and noise ratio of each respective tone of the first data stream layer is determined by multiplying an individualized signal to interference and noise ratio for the respective tone within the first data stream layer by a correction factor consisting of one minus a normalized correlation between the first data stream layer and the second data stream layer that is divided by one plus a reciprocal of an individualized signal to interference and noise ratio for the respective tone within the second data stream layer, and wherein the signal to interference and noise ratio of each tone of the second data stream layer is determined by multiplying the individualized signal to interference and noise ratio for a respective tone within the second data stream layer by a second correction factor consisting of one minus a normalized correlation between the first data stream layer and the second data stream layer that is divided by one plus a reciprocal of the individualized signal to interference and noise ratio for a respective tone within the first data stream layer, wherein the first individualized signal to interference and noise ratio comprises a summation of terms wherein each term within the terms relates to a respective receive antenna within the multiple receive antennas, wherein each term comprises a product of a transmitted power on the tone and a square of a magnitude of a channel frequency response from a first transmit antenna associated with the first data stream to the respective receive antenna within the multiple receive antennas, the product being divided by a variance of interference and noise values of the multiple receive antennas radio channel, and wherein the second individualized signal to interference and noise ratio comprises a summation of terms wherein each term within the terms relates to a respective receive antenna within the multiple receive antennas, wherein each term comprises a product of a transmitted power on the tone and a square of a magnitude of a channel frequency response from a second transmit antenna associated with the second data stream to the respective receive antenna within the multiple receive antennas, the product being divided by a variance of interference and noise values of the multiple receive antennas radio channel.

11. The method of claim 1, wherein the estimating the first data throughput is based upon one logarithm calculation of an average of signal to interference and noise ratios of at least two tones within the space time coding technique.

12. The method of claim 11, wherein the signal to interference and noise ratio of the respective tones within each data stream of the space time coding technique is calculated based on estimated channel response and comprises a summation of signal to interference and noise ratios from one of two transmit antennas to one of two receive antennas.

13. The method of claim 1, wherein the estimating the second data throughput is based upon one logarithm calculation of an average of signal to interference and noise ratios of at least two tones within each data stream of the spatial multiplexing technique.

14. The method of claim 13, wherein signal to interference and noise ratio of each tone within each data stream of the spatial multiplexing technique is calculated based on estimated channel response, the plurality of data stream layers comprises a first data stream layer and a second data stream layer, wherein the signal to interference and noise ratio of each tone within each data stream layer of the plurality of data stream layers is calculated based on estimated channel response, and wherein the signal to interference and noise ratio of each respective tone of the first data stream layer is determined by multiplying an individualized signal to interference and noise ratio for the respective tone within the first data stream layer by a correction factor consisting of one minus a normalized correlation between the first data stream layer and the second data stream layer that is divided by one plus a reciprocal of an individualized signal to interference and noise ratio for the respective tone within the second data stream layer, and wherein the signal to interference and noise ratio of each tone of the second data stream layer is determined by multiplying the individualized signal to interference and noise ratio for a respective tone within the second data stream layer by a second correction factor consisting of one minus a normalized correlation between the first data stream layer and the second data stream layer that is divided by one plus a reciprocal of the individualized signal to interference and noise ratio for a respective tone within the first data stream layer, wherein the first individualized signal to interference and noise ratio comprises a summation of terms wherein each term within the terms relates to a respective receive antenna within the multiple receive antennas, wherein each term comprises a product of a transmitted power on the tone and a square of a magnitude of a channel frequency response from a first transmit antenna associated with the first data stream to the respective receive antenna within the multiple receive antennas, the product being divided by a variance of interference and noise values of the multiple receive antennas radio channel, and wherein the second individualized signal to interference and noise ratio comprises a summation of terms wherein each term within the terms relates to a respective receive antenna within the multiple receive antennas, wherein each term comprises a product of a transmitted power on the tone and a square of a magnitude of a channel frequency response from a second transmit antenna associated with the second data stream to the respective receive antenna within the multiple receive antennas, the product being divided by a variance of interference and noise values of the multiple receive antennas radio channel.

15. A wireless communications device, comprising:

a signal to interference and noise ratio estimator adapted to:

estimate, based upon a first signal to interference and noise ratio determined for at least one tone in a multiple transmit and multiple receive antennas radio channel using a space time coding technique, a first data throughput of the at least one multiple transmit and multiple receive antennas radio channel using the space time coding technique, and estimate, based upon a second signal to interference and noise ratio determined for at least one tone in a multiple transmit and multiple receive antennas radio channel using a spatial multiplexing technique, a second data throughput of the at least one multiple transmit and multiple receive antennas radio channel corresponding to using the spatial multiplexing technique, wherein the spatial multiplexing technique communicates a plurality of data stream layers through the at least one multiple transmit and multiple receive antennas radio channel;

a transmission technique selector, communicatively coupled to the signal to interference and noise ratio estimator, adapted to:

determine, based upon the first signal to interference and noise ratio and the second signal to interference and noise ratio, that the second data throughput is greater than the first data throughput and that a third data throughput of each layer within the plurality of data stream layers is greater than a threshold, select, in response to determining that the second data throughput is greater than the first data throughput and that the third data throughput of each layer within the plurality of data stream layers is greater than a threshold, the spatial multiplexing technique as a selected technique, and select, in response to determining at least one of that the second data throughput is not greater than the first data throughput and that a third data throughput of at least one layer of data streams based upon the second signal to interference noise ratio is not greater than the threshold, the space time coding technique as the selected technique; and a data communications controller, communicatively coupled to the transmission technique selector, adapted to communicating the selected technique and at least one corresponding channel quality indices to a transmitter.

16. The wireless communications device of claim 15, wherein the signal to interference and noise ratio estimator is adapted to estimate by estimating the first data throughput based upon a plurality of logarithms, each logarithm within the plurality of logarithms comprising a logarithm of a term comprising a signal to interference and noise ratio of a respective tone within the space time coding technique.

17. The wireless communications device of claim 15, wherein the signal to interference and noise ratio estimator is adapted to estimate by estimating the second data throughput based upon a plurality of logarithms, each logarithm within the plurality of logarithms comprising a logarithm of a term comprising a signal to interference and noise ratio of a respective tone within each data stream of the spatial multiplexing technique.

18. The wireless communications device of claim 15, wherein the signal to interference and noise ratio estimator is adapted to estimate the first data throughput based upon one logarithm calculation of an average of signal to interference and noise ratios of at least two tones within the space time coding technique.

19. The wireless communications device of claim 15, wherein the signal to interference and noise ratio estimator is adapted to estimate the second data throughput based upon one logarithm calculation of an average of signal to interference and noise ratios of at least two tones within each data stream of the spatial multiplexing technique.

20. A portable data processor and communications device, comprising:
- a data interface adapted to at least one of receiving data from an external source and sending data to an external device;
- a data processor, communicatively coupled to the data interface and adapted to process the data;
- an RF transmitter communicatively coupled to the data processor;
- an RF receiver communicatively coupled to the data processor;
- a multiple antenna array adapted to provide an interface to a multiple transmit and multiple receive antennas radio channel;
- a signal to interference and noise ratio estimator, communicatively coupled to the RF receiver, adapted to:
  - estimate, based upon a first signal to interference and noise ratio determined for at least one tone in the multiple transmit and multiple receive antennas radio channel using a space time coding technique, a first data throughput of the at least one multiple transmit and multiple receive antennas radio channel using the space time coding technique, and
  - estimate, based upon a second signal to interference and noise ratio determined for at least one tone in a multiple transmit and multiple receive antennas radio channel using a spatial multiplexing technique, a second data throughput of the at least one multiple transmit and multiple receive antennas radio channel corresponding to using the spatial multiplexing technique, wherein the spatial multiplexing technique communicates a plurality of data stream layers through the at least one multiple transmit and multiple receive antennas radio channel;
- a transmission technique selector, communicatively coupled to the signal to interference and noise ratio estimator, adapted to:
  - determine, based upon the first signal to interference and noise ratio and the second signal to interference and noise ratio, that the second data throughput is greater than the first data throughput and that a third data throughput of each layer within the plurality of data stream layers is greater than a threshold,
  - select, in response to determining that the second data throughput is greater than the first data throughput and that the third data throughput of each layer within the plurality of data stream layers is greater than a threshold, the spatial multiplexing technique as a selected technique, and
  - select, in response to determining at least one of that the second data throughput is not greater than the first data throughput and that the third data throughput of at least one layer of data streams based upon the second signal to interference noise ratio is not greater than the threshold, the space time coding technique as the selected technique; and
- a data communications controller, communicatively coupled to the transmission technique selector and the RF transmitter, adapted to communicating the selected technique and at least one corresponding channel quality indices to a transmitter through the RF transmitter.

* * * * *